(12) United States Patent
Shen et al.

(10) Patent No.: US 12,636,842 B2
(45) Date of Patent: May 26, 2026

(54) HORIZONTAL ULTRASONIC WELDING THERMOPLASTIC MATERIAL

(71) Applicant: Rohr, Inc., Chula Vista, CA (US)

(72) Inventors: Shyan Bob Shen, San Diego, CA (US); Michael van Tooren, San Diego, CA (US); Keith E. Ritchie, San Diego, CA (US); Daniel O. Ursenbach, El Cajon, CA (US)

(73) Assignee: Rohr, Inc., Chula Vista, CA (US)

( * ) Notice: Subject to any disclaimer, the term of this patent is extended or adjusted under 35 U.S.C. 154(b) by 342 days.

(21) Appl. No.: 18/227,691

(22) Filed: Jul. 28, 2023

(65) Prior Publication Data

US 2025/0033302 A1     Jan. 30, 2025

(51) Int. Cl.
| | |
|---|---|
| B29C 65/08 | (2006.01) |
| B29C 65/72 | (2006.01) |
| B29C 73/10 | (2006.01) |
| B29K 105/06 | (2006.01) |
| B29L 31/30 | (2006.01) |

(52) U.S. Cl.
CPC .............. B29C 73/10 (2013.01); B29C 65/08 (2013.01); B29C 65/72 (2013.01); *B29K 2105/06* (2013.01); *B29L 2031/3076* (2013.01)

(58) Field of Classification Search
CPC ....... B29C 65/08; B29C 65/081; B29C 65/72; B29C 66/21; B29C 66/301; B29C 73/10; B29C 73/04; B29C 73/06; B29C 73/34
USPC .......................................................... 156/94
See application file for complete search history.

(56) References Cited

U.S. PATENT DOCUMENTS

| | | | |
|---|---|---|---|
| 4,090,897 | A | 5/1978 | Minick |
| 5,882,756 | A | 3/1999 | Alston |
| 9,845,142 | B2 | 12/2017 | Gleason |
| 10,427,241 | B2 | 10/2019 | Shah |
| 10,625,475 | B2 | 4/2020 | Nakano |
| 10,710,352 | B2 | 7/2020 | Bertrand |
| 11,104,086 | B2 | 8/2021 | Wee |
| 11,654,636 | B2 | 5/2023 | Wang |
| 2017/0355149 | A1* | 12/2017 | Wang ..................... B29C 73/34 |
| 2020/0015325 | A1 | 1/2020 | Zhao |
| 2020/0338835 | A1 | 10/2020 | Wang |
| 2023/0059804 | A1 | 2/2023 | Short |
| 2023/0059894 | A1 | 2/2023 | Myrdek |

FOREIGN PATENT DOCUMENTS

| | | |
|---|---|---|
| CA | 2442522 C | 11/2006 |
| EP | 4122686 A1 | 1/2023 |

OTHER PUBLICATIONS

EP Search Report for EP Patent Application No. 24191291.4 dated Dec. 16, 2024.

* cited by examiner

*Primary Examiner* — James D Sells
(74) *Attorney, Agent, or Firm* — Getz Balich LLC

(57) ABSTRACT

A repair method is provided during which a thermoplastic patch is arranged on a thermoplastic aerospace component. The thermoplastic patch contacts the thermoplastic aerospace component. The thermoplastic patch is horizontal ultrasonic welded to the thermoplastic aerospace component using an ultrasonic horn.

17 Claims, 7 Drawing Sheets

500

HORIZONTAL ULTRASONIC WELDING THERMOPLASTIC MATERIAL

BACKGROUND

1. Technical Field

This disclosure relates generally to welding and, more particularly, to ultrasonic welding thermoplastic material.

2. Background Information

Various systems and methods are known in the art for ultrasonic welding thermoplastic material. While these known ultrasonic welding systems and methods have various benefits, there is still room in the art for improvement.

SUMMARY OF THE DISCLOSURE

According to an aspect of the present disclosure, a repair method is provided during which a thermoplastic patch is arranged on a thermoplastic aerospace component. The thermoplastic patch contacts the thermoplastic aerospace component. The thermoplastic patch is horizontal ultrasonic welded to the thermoplastic aerospace component using an ultrasonic horn.

According to another aspect of the present disclosure, a method is provided during which material is removed from a first thermoplastic body to form an aperture in the first thermoplastic body. The aperture extends into the first thermoplastic body from an exterior surface of the thermoplastic body to an interior surface of the thermoplastic body. A second thermoplastic body is arranged in the aperture. The second thermoplastic body contacts the interior surface of the thermoplastic body. The second thermoplastic body is ultrasonic welded to the first thermoplastic body using an ultrasonic horn. The ultrasonic horn engages a surface of the second thermoplastic body. The ultrasonic horn moves back-and-forth along the surface of the second thermoplastic body during the ultrasonic welding of the second thermoplastic body.

According to still another aspect of the present disclosure, another method is provided during which a first thermoplastic body with a damaged portion is provided. A second thermoplastic body is arranged on an exterior surface of the first thermoplastic body. The second thermoplastic body covers the first thermoplastic body. The second thermoplastic body is ultrasonic welded to the first thermoplastic body using an ultrasonic horn. The ultrasonic horn engages a surface of the second thermoplastic body. The ultrasonic horn moves back-and-forth along the surface of the second thermoplastic body during the ultrasonic welding of the second thermoplastic body.

The method may also include: arranging a third thermoplastic body in the aperture, the third thermoplastic body contacting the surface of the second thermoplastic body; and ultrasonic welding the third thermoplastic body to the second thermoplastic body using the ultrasonic horn, the ultrasonic horn engaging a surface of the third thermoplastic body, and the ultrasonic horn moving back-and-forth along the surface of the third thermoplastic body during the ultrasonic welding of the third thermoplastic body.

The method may also include: arranging a third thermoplastic body in the aperture, the third thermoplastic body contacting a second interior surface of the first thermoplastic body; and ultrasonic welding the third thermoplastic body to the first thermoplastic body using the ultrasonic horn, the ultrasonic horn engaging a surface of the third thermoplastic body, and the ultrasonic horn moving back-and-forth along the surface of the third thermoplastic body during the ultrasonic welding of the third thermoplastic body.

The method may also include: arranging a third thermoplastic body on the exterior surface of the first thermoplastic body, the third thermoplastic body covering the aperture; and ultrasonic welding the third thermoplastic body to the first thermoplastic body using the ultrasonic horn, the ultrasonic horn engaging a surface of the third thermoplastic body, and the ultrasonic horn moving back-and-forth along the surface of the third thermoplastic body during the ultrasonic welding of the third thermoplastic body.

The ultrasonic horn may extend along a centerline. A face of the ultrasonic horn extending longitudinally along the centerline may engage the thermoplastic patch. The ultrasonic horn may move back and forth along the centerline during the horizontal ultrasonic welding.

The face of the ultrasonic horn may contact a surface of the thermoplastic patch. The centerline may be parallel to the surface of the thermoplastic patch.

The thermoplastic patch may have a surface that extends between opposing exterior sides of the thermoplastic patch. An entirety of the surface may contact the thermoplastic aerospace component.

The thermoplastic patch may be connected to the thermoplastic aerospace component without use of an adhesive and/or without use of thermoplastic film as an energy director.

The thermoplastic patch may include a thermoplastic matrix and fiber-reinforcement embedded within the thermoplastic matrix.

The thermoplastic aerospace component may include a thermoplastic matrix and fiber-reinforcement embedded within the thermoplastic matrix.

The thermoplastic aerospace component may include an aperture, an exterior surface and an interior surface. The aperture may extend into the thermoplastic aerospace component from the exterior surface to the interior surface. The thermoplastic patch may be disposed in the aperture and contact the interior surface.

The method may also include: arranging a second thermoplastic patch in the aperture, the second thermoplastic patch contacting a surface of the thermoplastic patch; and horizontal ultrasonic welding the second thermoplastic patch to the thermoplastic patch using the ultrasonic horn.

The method may also include horizontal ultrasonic welding the second thermoplastic patch to the thermoplastic aerospace component using the ultrasonic horn. The second thermoplastic patch may contact a second interior surface of the thermoplastic aerospace component.

The method may also include: arranging a second thermoplastic patch on the exterior surface, the second thermoplastic patch covering the aperture; and horizontal ultrasonic welding the second thermoplastic patch to the thermoplastic aerospace component using the ultrasonic horn.

The method may also include removing a damaged portion of the thermoplastic aerospace component to form the aperture.

The thermoplastic patch may cover a damaged portion of the thermoplastic aerospace component.

The thermoplastic patch may be horizontal ultrasonic welded to the thermoplastic aerospace component at a plurality of spot weld locations along the thermoplastic patch.

The thermoplastic patch may be horizontal ultrasonic welded to the thermoplastic aerospace component along an elongated weld seam.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
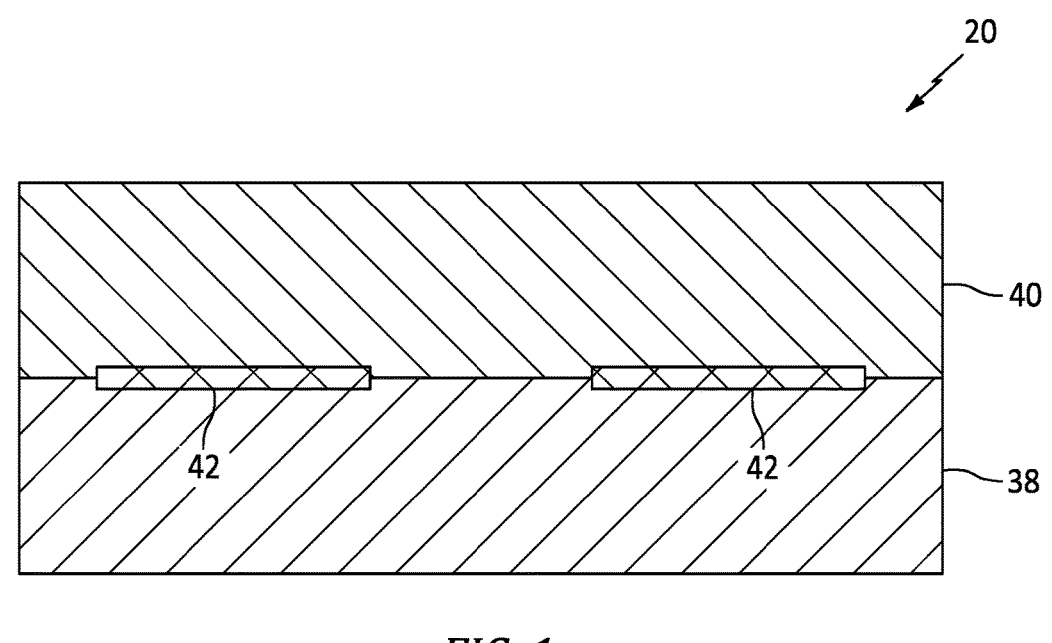
FIG. 1 is a partial schematic sectional illustration of a thermoplastic component.

The present disclosure includes methods for repairing (e.g., fixing, remanufacturing, etc.) a thermoplastic component 20 (e.g., a thermoplastic composite component) of an aerospace vehicle such as an aircraft, where an exemplary section of the aircraft component 20 following its repair is shown in FIG. 1. The aircraft may be an airplane, a helicopter, a drone (e.g., an unmanned aerial vehicle (UAV)) or any other manned or unmanned aerial vehicle or system. The present disclosure, however, is not limited to aircraft applications. The aerospace vehicle, for example, may alternatively be a space shuttle, a missile or a rocket. However, for ease of description, the aerospace vehicle is generally described as the aircraft below.

Figure 2:
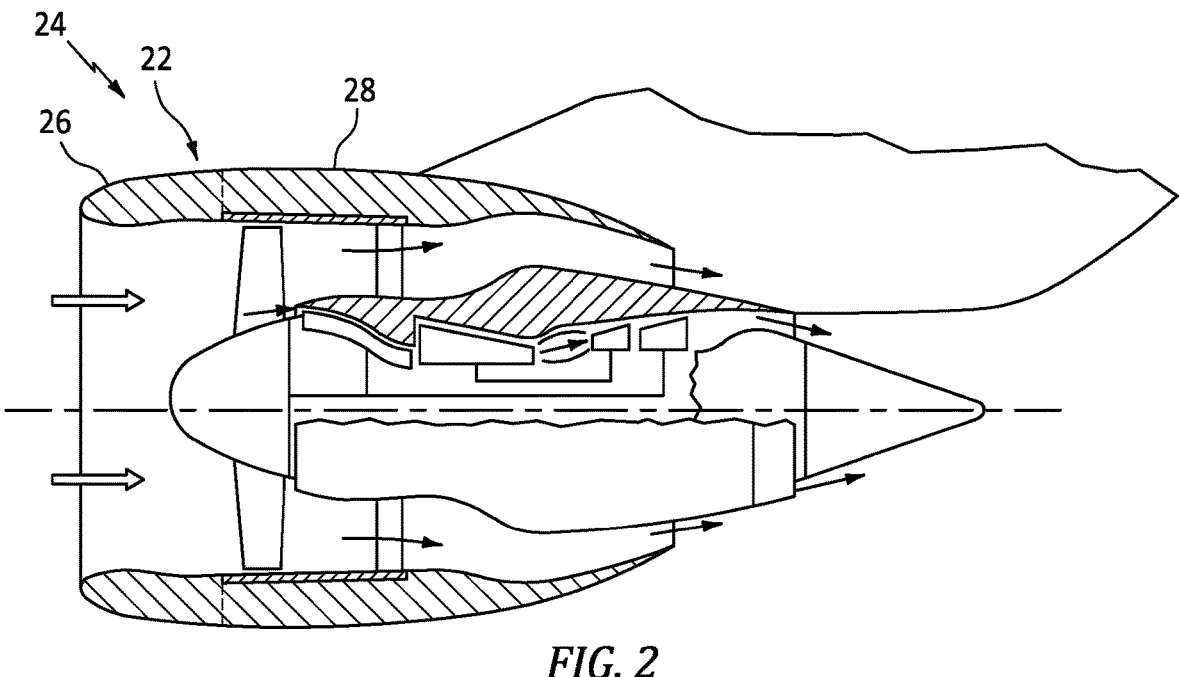
FIG. 2 is a cutaway schematic sectional illustration of an aircraft propulsion system which may include the thermoplastic component.
Figure 3:
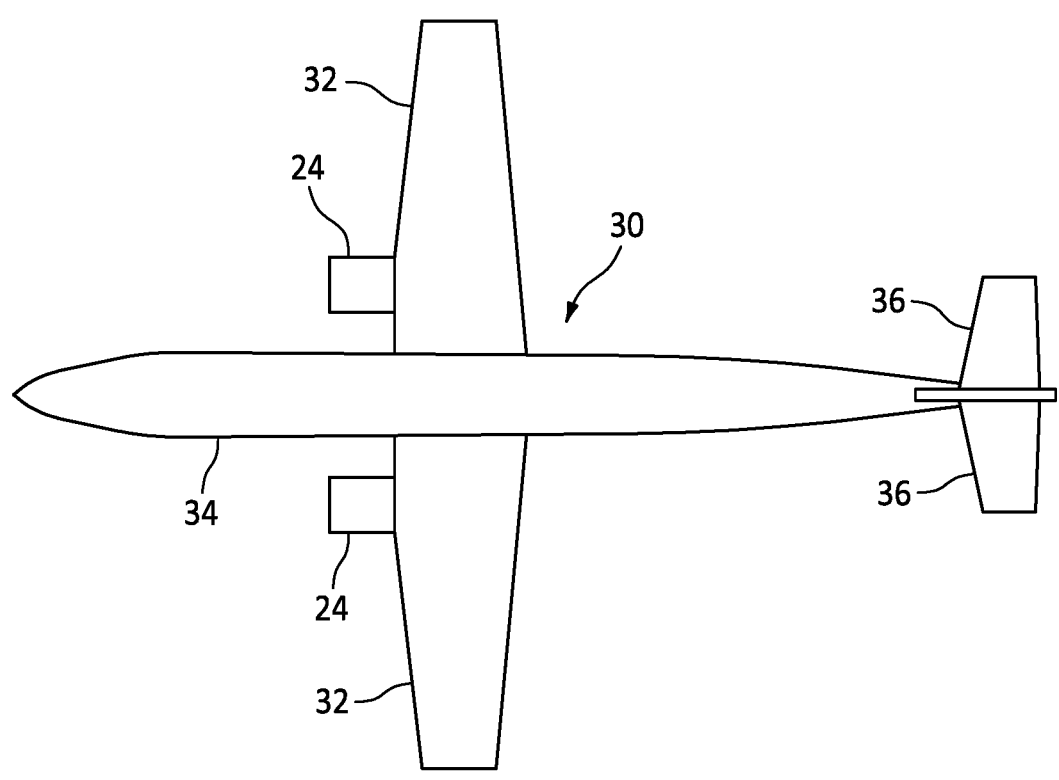
FIG. 3 is a schematic illustration of an aircraft with an aircraft airframe which may include the thermoplastic component.

Referring to FIG. 2, the aircraft component 20 may be configured as or otherwise included as part of a nacelle 22 of a propulsion system 24 for the aircraft. The aircraft component 20, for example, may be (or may be part of) a component of a nacelle inlet structure 26; e.g., a nacelle inlet lip (e.g., a nose lip), a nacelle outer barrel, a nacelle inner barrel, etc. In another example, the aircraft component 20 may be (or may be part of) another component of the propulsion system nacelle 22 such as a cowl 28 (e.g., a fan cowl), or the like. Referring to FIG. 3, the aircraft component 20 may alternatively be configured as or otherwise included as part of an airframe 30 of the aircraft. The aircraft component 20, for example, may be (or may be part of) an aircraft wing 32, an aircraft fuselage skin 34, an aircraft stabilizer 36, or the like. The aircraft component 20 may still alternatively be configured as or otherwise included as part of a structure within the aircraft airframe 30; e.g., within a cabin of the aircraft. The present disclosure, however, is not limited to manufacturing the foregoing exemplary aircraft components. Moreover, it is contemplated the methods of the present disclosure may be utilized for repairing non-aircraft components. However, for ease of description, the thermoplastic component is generally described below as the aircraft component 20.

Figure 4:
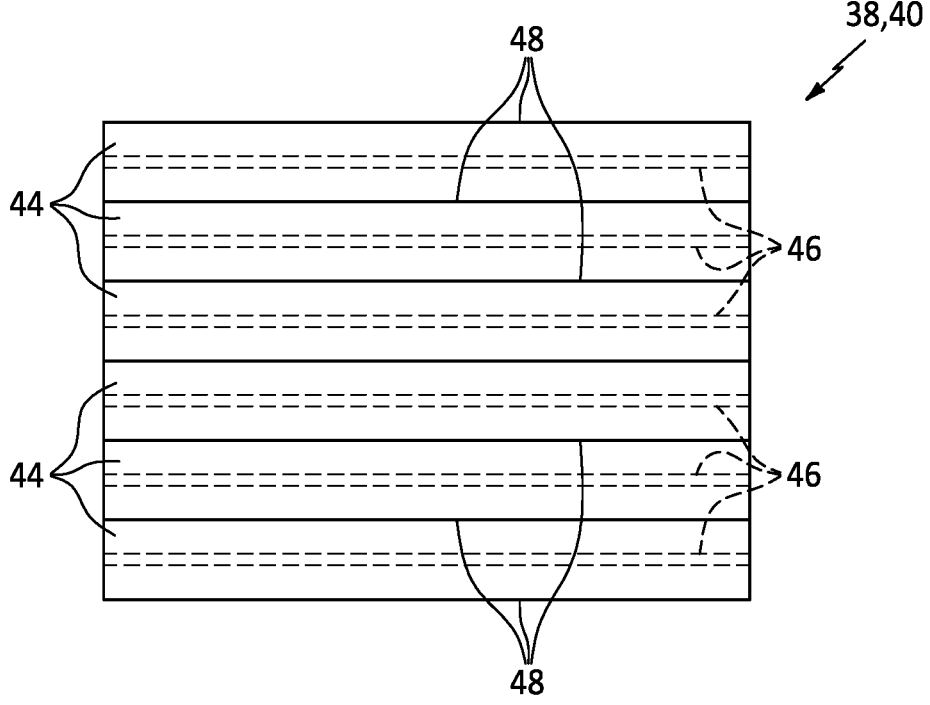
FIG. 4 is a partial schematic sectional illustration of layers in the thermoplastic component.

The aircraft component 20 of FIG. 1 includes a thermoplastic component base 38 and at least (or only) one thermoplastic component patch 40 ultrasonic welded to the component base 38 at one or more weld locations 42. Briefly, the component base 38 is configured as a portion or an entirety of a damaged aircraft component which is to be repaired. Referring to FIG. 4, each of the thermoplastic bodies 38 and 40 may include a thermoplastic matrix 44 and fiber-reinforcement 46 embedded within the thermoplastic matrix 44.

Examples of the thermoplastic matrix 44 include, but are not limited to, a semi-crystalline thermoplastic resin and an amorphous thermoplastic resin. Examples of the semi-crystalline thermoplastic resin include polyester polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), and liquid crystal polymer (LCP). Examples of the polyester include polytrimethylene terphthalate (PTT), polyethylene naphthalate (PEN), and liquid crystal polyester. An example of the polyarylene sulfide is polyphenylene sulfide (PPS). Examples of the amorphous thermoplastic resin include polycarbonate (PC), polymethyl methacrylate (PMMA), polyphenylene ether (PPE), polyimide (PI), polyamide imide (PAI), polyetherimide (PEI), polysulfone (PSU), polyether sulfone (PES), and polyarylate (PAR). The present disclosure, however, is not limited to the foregoing exemplary thermoplastic matrix materials.

The fiber-reinforcement 46 may be arranged in one or more layers 48 within the respective thermoplastic body 38, 40 and its thermoplastic matrix 44. Each layer 48 of the fiber-reinforcement 46 may include a plurality of fiber-reinforcement fibers such as metal fibers, carbon fibers, insulating fibers, organic fibers, and inorganic fibers. Examples of the metal fibers include aluminum fibers, brass fibers, and stainless steel fibers. Examples of the carbon fibers include graphite fibers such as polyacrylonitrile (PAN)-based carbon fibers, rayon-based carbon fibers, lignin-based carbon fibers, and pitch-based carbon fibers. An example of the insulating fibers is glass fibers; e.g., fiberglass fibers. Examples of the organic fibers include aramid fibers, polyparaphenylene benzoxazole (PBO) fibers, polyphenylene sulfide fibers, polyester fibers, acrylic fibers, nylon fibers, and polyethylene fibers. Examples of the inorganic fibers include silicon carbide fibers and silicon nitride fibers. The present disclosure, however, is not limited to the foregoing exemplary fiber-reinforcement materials.

The fiber-reinforcement 46 in each layer 48 of the respective thermoplastic body 38, 40 may entirely be a common (the same) fiber-reinforcement material. Alternatively, the fiber-reinforcement 46 in one or more or all of the layers 48 may include multiple different fiber-reinforcement materials within the same layer 48. Different layers 48 within the respective thermoplastic body 38, 40 may also or alternatively be configured with different fiber-reinforcement materials between those layers 48; e.g., one layer 48 may include a first material or combination of materials and another layer 48 may include a second material or combination of materials. Some or all of the fibers within a respective layer 48 may be continuous fibers. Some or all of the fibers within a respective layer 48 may also or alternatively be chopped fibers. Some or all of the fibers within a respective layer 48 may be unidirectional. Some or all of the fibers within a respective layer 48 may alternatively be multi-directional; e.g., in a woven sheet, a mat of chopped fibers, etc. The present disclosure, however, is not limited to the foregoing exemplary fiber types and/or fiber arrangements. Moreover, while each thermoplastic body 38, 40 is described above as including the fiber-reinforcement 46, it is contemplated one or more of these thermoplastic bodies 38 and 40 may alternatively be configured without any the fiber-reinforcement 46 embedded within the thermoplastic matrix 44.

In some embodiments, the thermoplastic bodies 38 and 40 may be configured with a common thermoplastic matrix material and/or a common fiber-reinforcement material(s). In other embodiments, however, the thermoplastic bodies 38 and 40 may alternatively be configured with different (although weldably compatible) thermoplastic matrix materials. The thermoplastic bodies 38 and 40 may also or alternatively be configured with different fiber-reinforcement materials and/or with different fiber patterns; e.g., weaves, etc.

Figure 5:
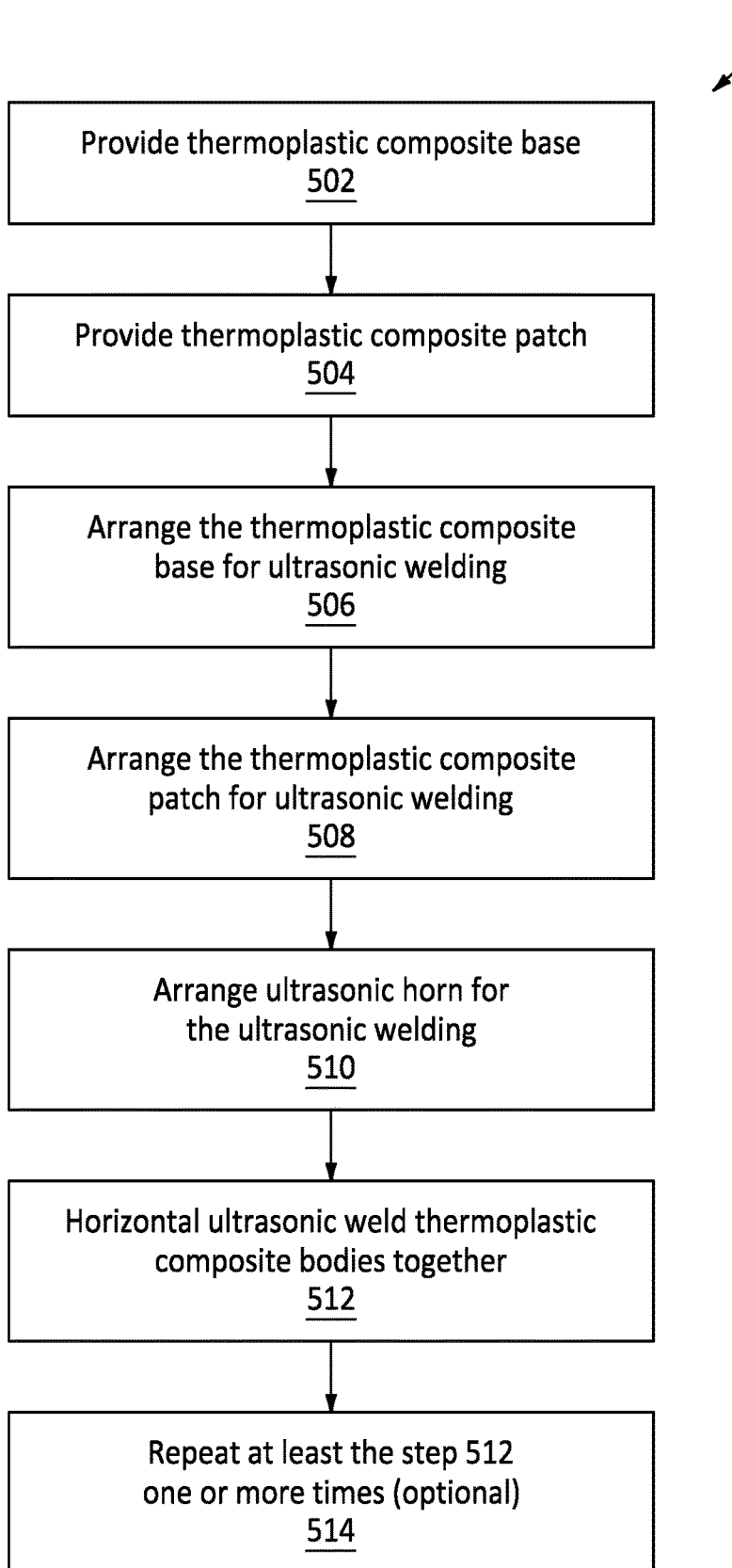
FIG. 5 is a flow diagram of a method for repairing a thermoplastic component.

FIG. 5 is a flow diagram of a method 500 for repairing a thermoplastic component; e.g., a thermoplastic composite component. For ease of description, the repair method 500 is described below with reference to the aircraft component 20 of FIG. 1. The present disclosure, however, is not limited to repairing or otherwise welding such an exemplary component.

In step 502, the component base 38 is provided. The damaged component to be repaired, for example, may be removed from the aircraft and/or otherwise received and prepared for patching. Alternatively, the damaged component to be repaired may be prepared for patching while still installed with the aircraft.

In step 504, the component patch 40 is provided. A piece of thermoplastic stock material, for example, may be cutout to form the component patch 40. The thermoplastic stock material may be a (e.g., laminated) sheet of thermoplastic composite material, prepreg material, etc. The component patch 40, of course, may alternatively be laminated, molded, pressed, injection molded, stamped and/or otherwise formed.

Figure 6:
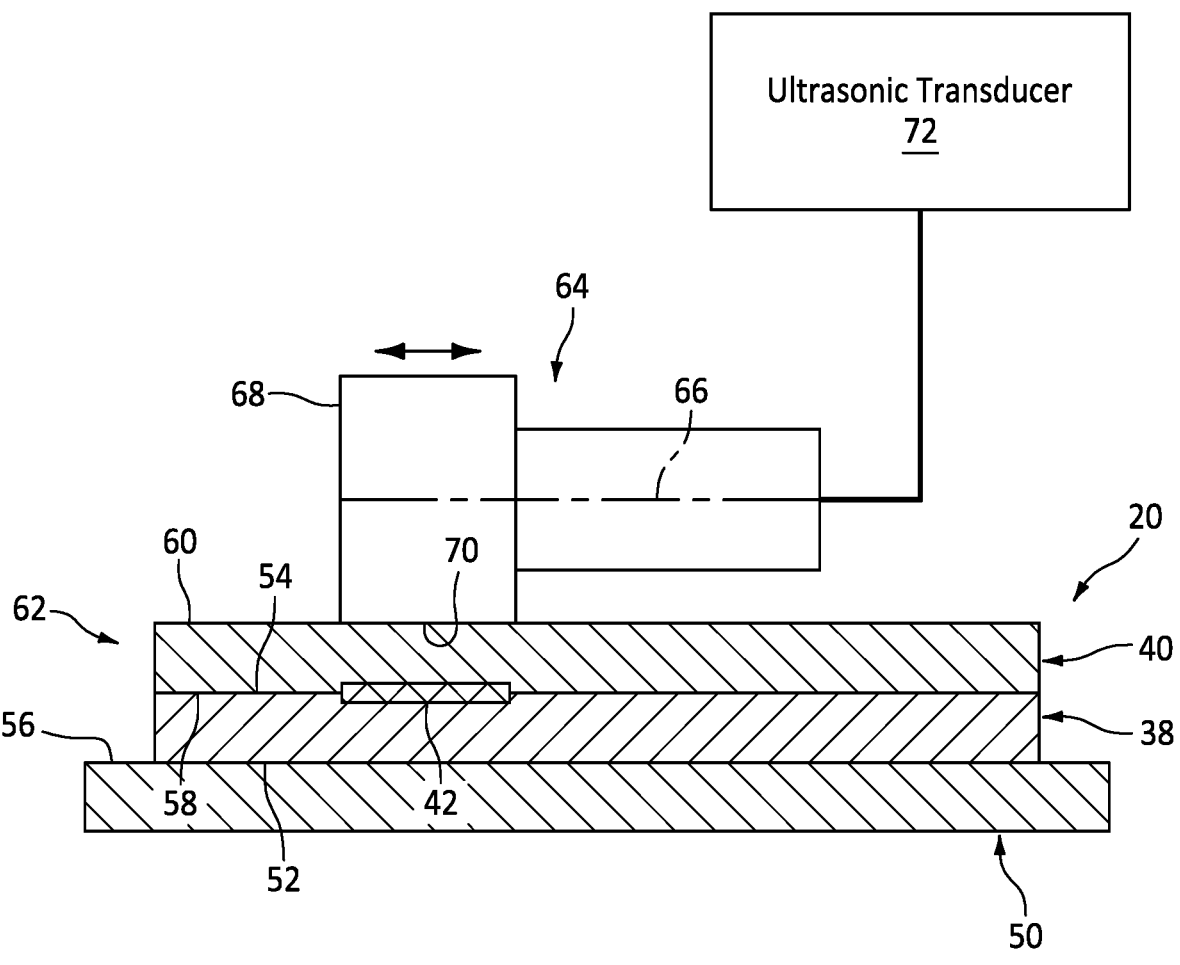
FIG. 6 is a partial schematic sectional illustration of a system for ultrasonic welding an arrangement of thermoplastic components together.

In step 506, the component base 38 may be arranged with a rigid support structure 50; e.g., a metal anvil or die. For example, referring to FIG. 6, the component base 38 may be disposed on the support structure 50. The component base 38 of FIG. 6 has a thickness that extends vertically between and to a first (e.g., lower) surface 52 of the component base 38 and a second (e.g., upper) surface 54 of the component base 38. The base first surface 52 of FIG. 6 is abutted against and contacts a (e.g., upper) support surface 56 of the support structure 50. The base first surface 52, for example, may lay against (e.g., rest on, be disposed in full contact with, be disposed flat against, etc.) the structure support surface 56. While the surfaces 52 and 56 are shown with straight-line sectional geometries in the plane of FIG. 6, it is contemplated the surfaces 52 and 56 may alternatively have non-straight-line (e.g., curved, compound, etc.) sectional geometries in the plane of FIG. 6. Moreover, the surfaces 52 and 56 may also or alternatively have straight-line or nonstraight-line sectional geometries in a plane perpendicular to the plane of FIG. 6. For example, the surfaces 52 and 56 may be flat, planar surfaces, two-dimensional (2D) curved or otherwise non-flat surfaces, or three-dimensional (3D) curved or otherwise non-flat surfaces. Referring again to FIG. 6, the component base 38 may be (e.g., temporarily) secured to the support structure 50, or the component base 38 may simply rest against the support structure 50.

In step 508, the component patch 40 is arranged with the component base 38 for the ultrasonic welding. For example, the component patch 40 of FIG. 6 is disposed on the component base 38. The component patch 40 of FIG. 6 has a thickness that extends vertically between and to a first (e.g., lower) surface 58 of the component patch 40 and a second (e.g., upper) surface 60 of the component patch 40. The patch first surface 58 of FIG. 6 is abutted against and contacts the base second surface 54. The patch first surface 58, for example, may lay against (e.g., rest on, be disposed in full contact with, be disposed flat against, etc.) the base second surface 54. While the surfaces 54 and 58 are shown with straight-line sectional geometries in the plane of FIG. 6, it is contemplated the surfaces 54 and 58 may alternatively have non-straight-line (e.g., curved, compound, etc.) sectional geometries in the plane of FIG. 6. Moreover, the surfaces 54 and 58 may also or alternatively have straight-line or non-straight-line sectional geometries in a plane perpendicular to the plane of FIG. 6. For example, the surfaces 54 and 58 may be flat, planar surfaces, two-dimensional (2D) curved or otherwise non-flat surfaces, or three-dimensional (3D) curved or otherwise non-flat surfaces. Referring again to FIG. 6, the component base 38 is disposed vertically between and contacts the support structure 50 and the component patch 40; e.g., without any vertical gaps and/or other materials (e.g., adhesive, etc.) in between. Here, the (still discrete, non-welded) thermoplastic bodies 38 and 40 are arranged in a stack 62 on/over the support structure 50. The component patch 40 may be (e.g., temporarily) secured to the component base 38, or the component patch 40 may simply rest against the component base 38.

In step 510, an ultrasonic horn 64 (e.g., a sonotrode) used for the ultrasonic welding is arranged with the component patch 40. The ultrasonic horn 64 extends longitudinally along a centerline 66 of the ultrasonic horn 64 to a distal end 68 of the ultrasonic horn 64. This ultrasonic horn 64 includes an engagement surface 70 at (e.g., on, adjacent or proximate) the horn distal end 68. This engagement surface 70 is disposed to a face of the ultrasonic horn 64 (e.g., to a side of the ultrasonic horn 64), and extends longitudinally along the horn centerline 66. The engagement surface 70 is positioned over the component patch 40, and engages (e.g., fully contacts) the component patch 40 and its patch second surface 60. With this arrangement, the ultrasonic horn 64 extends longitudinally along the component patch 40 and its patch second surface 60. The horn centerline 66, for example, may be substantially (e.g., within 2-5 degrees of) or completely parallel with the component patch 40 and its patch second surface 60. The ultrasonic horn 64 of FIG. 6 is further operatively coupled to an ultrasonic transducer 72.

In step 512, the thermoplastic bodies 38 and 40 are horizontal ultrasonic welded together using the ultrasonic horn 64. The ultrasonic transducer 72, for example, is configured to move (e.g., translate, oscillate, etc.) the ultrasonic horn 64 back-and-forth longitudinally along the horn centerline 66 during the ultrasonic welding. This movement of the ultrasonic horn 64 heats the thermoplastic matrix 44 (see FIG. 4) of the component patch 40 and the component base 38. The heating softens and then locally melts the thermoplastic matrix 44 and thereby (e.g., spot) welds the component patch 40 to the component base 38 at and about a point longitudinally aligned with the ultrasonic horn 64 and its engagement surface 70; e.g., the weld location 42.

In step 514, at least (or only) the welding step 512 may be repeated one or more times at different locations along the thermoplastic composite body stack 62 and its component patch 40 to weld the component patch 40 to the component base 38 at one or more additional locations. The component patch 40 may thereby be spot welded to the component base 38 to (e.g., fully) connect the thermoplastic bodies 38 and 40 to form the aircraft component 20. Of course, it is contemplated the ultrasonic horn 64 may alternatively be translated to provide a (e.g., continuous) weld seam between the component patch 40 and the component base 38. By ultrasonic welding the thermoplastic bodies 38 and 40 together, the thermoplastic bodies 38 and 40 may be (e.g., fully) connected without requiring use of additional attachment means; e.g., adhesive, fasteners, etc.

Figure 7:
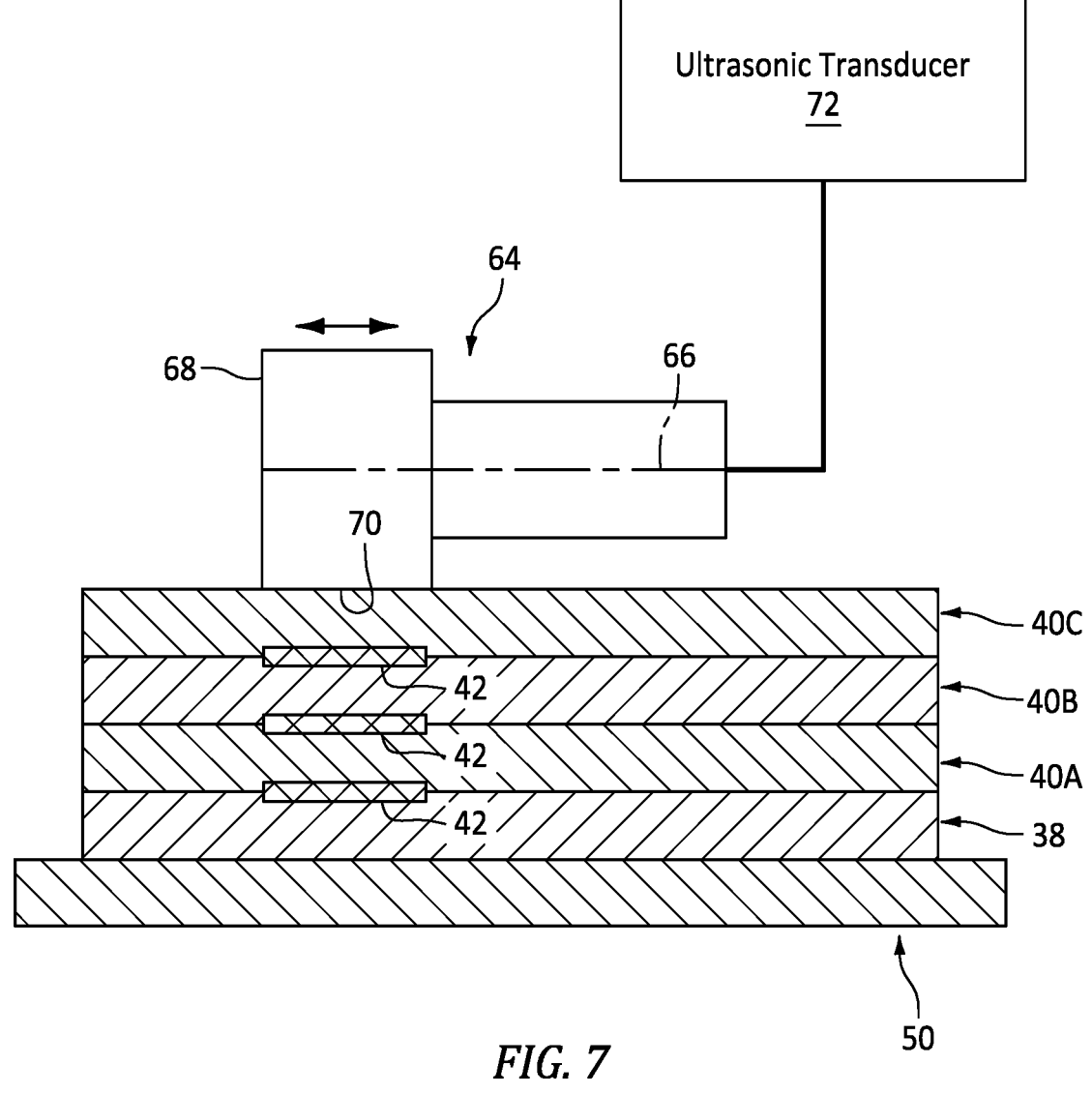
FIG. 7 is a partial schematic sectional illustration of the system for ultrasonic welding another arrangement of thermoplastic components together.

While the aircraft component 20 of FIG. 6 includes the single component patch 40, it is contemplated the aircraft component 20 may alternatively include multiple component patches 40A-C (generally referred to as "40") as shown in FIG. 7; e.g., a multi-layered patch/patch structure. For example, the second thermoplastic component patch 40B ("second component patch") may be ultrasonic welded to the first component patch 40A, for example, following the ultrasonic welding of the first component patch 40A to the component base 38. The third thermoplastic component patch 40C ("third component patch") may be ultrasonic welded to the second component patch 40B, for example, following the ultrasonic welding of the second component patch 40B to the first component patch 40A. The welding of these additional component patches 40B and 40C (e.g., patch layers) may be performed using the steps described above.

Figures 8, 9:
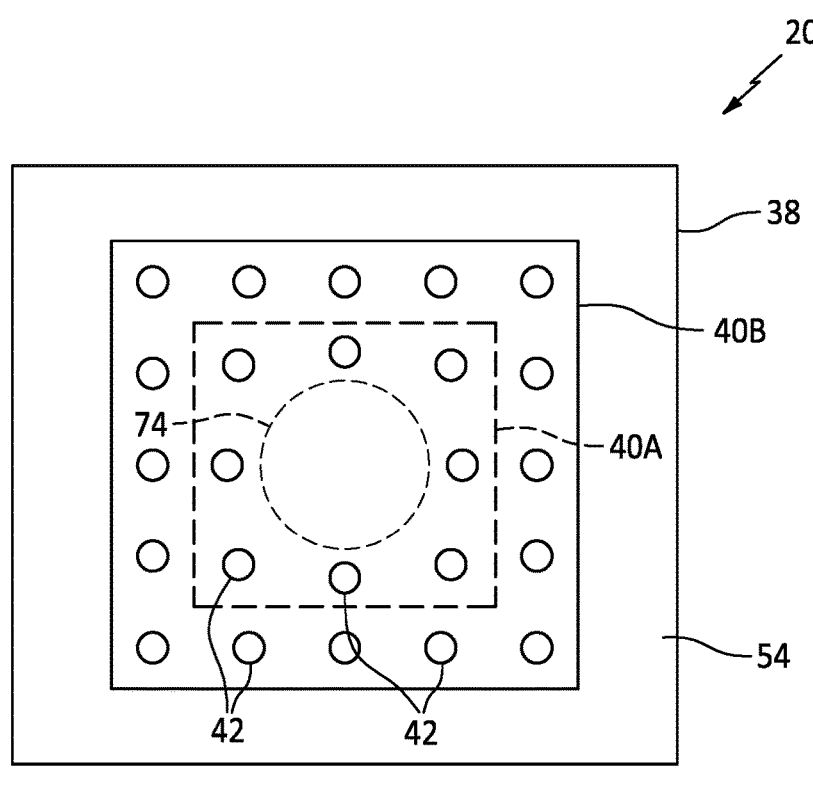
FIG. 8 is a partial schematic illustration of a repaired thermoplastic component.
FIG. 9 is a partial schematic sectional illustration of the repaired thermoplastic component of FIG. 8.

Referring to FIGS. 8 and 9, the one or more component patches 40 may be configured to cover a damaged portion 74 of the component base 38. The first component patch 40A of FIG. 9, for example, contacts the base second surface 54 (e.g., an exterior surface of the component base 38) and extends over the damaged portion 74 of the component base 38. This first component patch 40A is horizontal ultrasonic welded to the component base 38. The second component patch 40B of FIG. 9 contacts the first component patch 40A and may also contact the base second surface 54. This second component patch 40B is horizontal ultrasonic welded to the first component patch 40A and/or horizontal ultrasonic welded to the component base 38.

Figure 10:
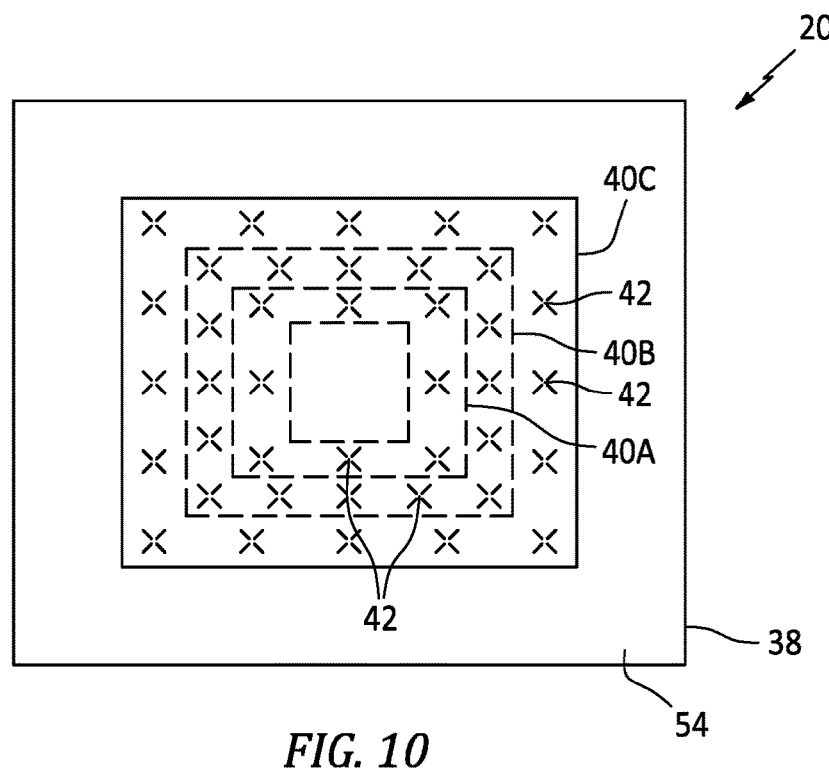
FIG. 10 is a partial schematic illustration of another repaired thermoplastic component.
Figure 11:
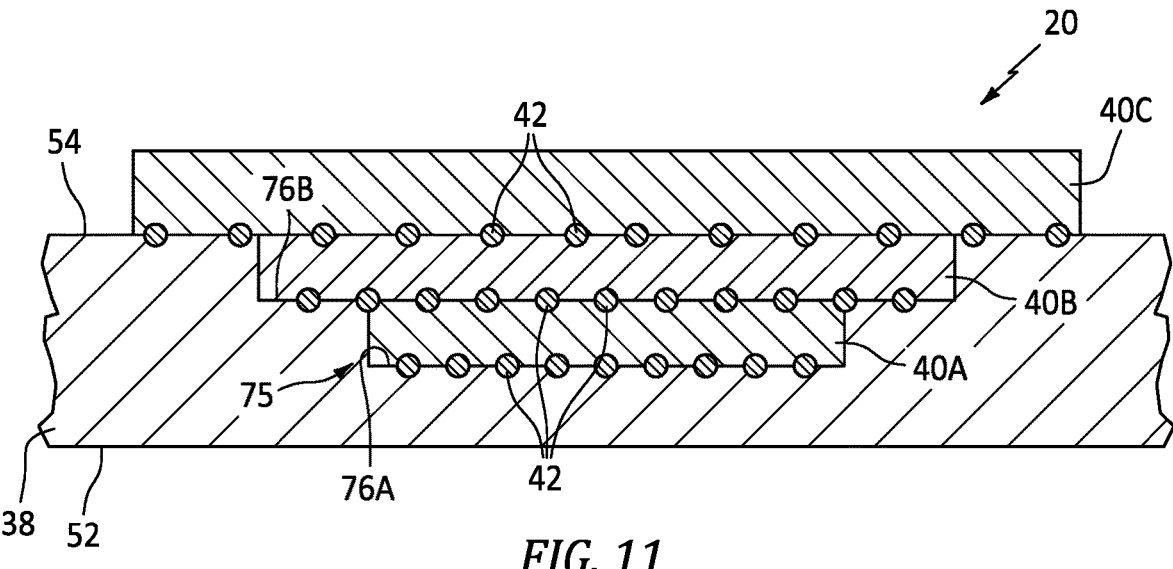
FIG. 11 is a partial schematic sectional illustration of the repaired thermoplastic component of FIG. 10.

Referring to FIGS. 10 and 11, the one or more component patches 40 may alternatively be configured to at least partially or completely replace the damaged portion of the component base 38. For example, some or all of the damaged portion of the component base 38 may be removed from the component base 38 via one or more removal techniques; e.g., machining, milling, cutting, grit blasting, etc. Referring to FIG. 11, this removal may form an aperture 75 (e.g., a tapered aperture, a plateaued aperture, etc.) in the component base 38. The aperture 75 of FIG. 11 projects (e.g., partially) vertically into the component base 38 from its base second surface 54 (e.g., an exterior surface of the component base 38) to one or more interior surfaces 76A and 76B (generally referred to as "76") of the component base 38. Following this removal, one or more of the component patches 40 may be individually disposed in/over the aperture 75 and welded to the component base 38. The first component patch 40A of FIG. 11 contacts the innermost interior surface 76A. The first component patch 40A is horizontal ultrasonic welded to the component base 38. The second component patch 40B of FIG. 11 contacts the first component patch 40A and may also contact the next outward interior surface 76B. The second component patch 40B is horizontal ultrasonic welded to the first component patch 40A and/or horizontal ultrasonic welded to the component base 38. The third component patch 40C of FIG. 11 is disposed outside of the aperture 75. The third component patch 40C contacts the second component patch 40B and may also contact the base second surface 54. The third component patch 40C is horizontal ultrasonic welded to the second component patch 40B and/or horizontal ultrasonic welded to the component base 38.

In some embodiments, referring to FIGS. 9 and 11, the base second surface 54 (along with the exposed component patch) may at least partially or completely form an exterior surface of the aircraft component 20. This exterior surface may also be an aerodynamic flow surface of the aircraft component 20. In other embodiments, referring to FIG. 6, the base first surface 52 may at least partially or completely form an exterior surface of the aircraft component 20. This exterior surface may also be an aerodynamic flow surface of the aircraft component 20. Note, by arranging the aerodynamic flow surface against the support structure 50, a shape and contour of the aerodynamic flow surface may be preserved during the horizontal ultrasonic welding.

The foregoing methods utilize localized heating at the weld interface. This localized heating may have less impact on nearby components and structure. Therefore, the methods of the present disclosure may be performed without, for example, a heating blanket. Moreover, the methods of the present disclosure may be performed quickly; e.g., less than thirty minutes depending upon the specific task; e.g., repair.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A repair method, comprising:

arranging a thermoplastic patch on a thermoplastic aerospace component, the thermoplastic patch contacting the thermoplastic aerospace component, the thermoplastic aerospace component including an aperture, an exterior surface and an interior surface, the aperture extending into the thermoplastic aerospace component from the exterior surface to the interior surface, and the thermoplastic patch disposed in the aperture and contacting the interior surface;

horizontal ultrasonic welding the thermoplastic patch to the thermoplastic aerospace component using an ultrasonic horn;

arranging a second thermoplastic patch in the aperture, the second thermoplastic patch contacting a surface of the thermoplastic patch; and horizontal ultrasonic welding the second thermoplastic patch to the thermoplastic patch using the ultrasonic horn.

2. The repair method of claim 1, wherein the ultrasonic horn extends along a centerline;

a face of the ultrasonic horn extending longitudinally along the centerline engages the thermoplastic patch; and the ultrasonic horn moves back and forth along the centerline during the horizontal ultrasonic welding.

3. The repair method of claim 2, wherein the face of the ultrasonic horn contacts a surface of the thermoplastic patch; and the centerline is parallel to the surface of the thermoplastic patch.

4. The repair method of claim 1, wherein the thermoplastic patch has a surface that extends between opposing exterior sides of the thermoplastic patch; and an entirety of the surface contacts the thermoplastic aerospace component.

5. The repair method of claim 1, wherein the thermoplastic patch is connected to the thermoplastic aerospace component without use of an adhesive and/or without use of thermoplastic film as an energy director.

6. The repair method of claim 1, wherein the thermoplastic patch includes a thermoplastic matrix and fiber-reinforcement embedded within the thermoplastic matrix.

7. The repair method of claim 1, wherein the thermoplastic aerospace component includes a thermoplastic matrix and fiber-reinforcement embedded within the thermoplastic matrix.

8. The repair method of claim 1, further comprising:

horizontal ultrasonic welding the second thermoplastic patch to the thermoplastic aerospace component using the ultrasonic horn;

the second thermoplastic patch contacting a second interior surface of the thermoplastic aerospace component.

9. The repair method of claim 1, further comprising:

arranging a third thermoplastic patch on the exterior surface, the third thermoplastic patch covering the aperture; and horizontal ultrasonic welding the third thermoplastic patch to the thermoplastic aerospace component using the ultrasonic horn.

10. The repair method of claim 1, further comprising removing a damaged portion of the thermoplastic aerospace component to form the aperture.

11. The repair method of claim 1, wherein the thermoplastic patch covers a damaged portion of the thermoplastic aerospace component.

12. The repair method of claim 1, wherein the thermoplastic patch is horizontal ultrasonic welded to the thermoplastic aerospace component at a plurality of spot weld locations along the thermoplastic patch.

13. The repair method of claim 1, wherein the thermoplastic patch is horizontal ultrasonic welded to the thermoplastic aerospace component along an elongated weld seam.

14. A method, comprising:

removing material from a first thermoplastic body to form an aperture in the first thermoplastic body, the aperture extending into the first thermoplastic body from an exterior surface of the first thermoplastic body to an interior surface of the first thermoplastic body;

arranging a second thermoplastic body in the aperture, the second thermoplastic body contacting the interior surface of the first thermoplastic body;

ultrasonic welding the second thermoplastic body to the first thermoplastic body using an ultrasonic horn, the ultrasonic horn engaging a surface of the second thermoplastic body, and the ultrasonic horn moving back-and-forth along the surface of the second thermoplastic body during the ultrasonic welding of the second thermoplastic body;

arranging a third thermoplastic body in the aperture, the third thermoplastic body contacting the surface of the second thermoplastic body; and ultrasonic welding the third thermoplastic body to the second thermoplastic body using the ultrasonic horn, the ultrasonic horn engaging a surface of the third thermoplastic body, and the ultrasonic horn moving back-and-forth along the surface of the third thermoplastic body during the ultrasonic welding of the third thermoplastic body.

15. The method of claim 14, further comprising:

arranging the third thermoplastic body in the aperture, the third thermoplastic body contacting a second interior surface of the first thermoplastic body; and ultrasonic welding the third thermoplastic body to the first thermoplastic body using the ultrasonic horn, the ultrasonic horn engaging a surface of the third thermoplastic body, and the ultrasonic horn moving back-and-forth along the surface of the third thermoplastic body during the ultrasonic welding of the third thermoplastic body.

16. The method of claim 14, further comprising:

arranging the third thermoplastic body on the exterior surface of the first thermoplastic body, the third thermoplastic body covering the aperture; and ultrasonic welding the third thermoplastic body to the first thermoplastic body using the ultrasonic horn, the ultrasonic horn engaging a surface of the third thermoplastic body, and the ultrasonic horn moving back-and-forth along the surface of the third thermoplastic body during the ultrasonic welding of the third thermoplastic body.

17. A method, comprising:

providing a first thermoplastic body with a damaged portion;

arranging a second thermoplastic body on an exterior surface of the first thermoplastic body, the second thermoplastic body covering a damaged portion of the first thermoplastic body; and ultrasonic welding the second thermoplastic body to the first thermoplastic body using an ultrasonic horn, the ultrasonic horn engaging a surface of the second thermoplastic body, and the ultrasonic horn moving back-and-forth along the surface of the second thermoplastic body during the ultrasonic welding of the second thermoplastic body.

* * * * *